Sept. 15, 1925.  
D. McDERMOTT  
QUICK ACTING GAUGE  
Filed Aug. 14, 1924

1,553,387

Inventor:  
David McDermott,  
by Walter E. Lombard.  
Atty.

Patented Sept. 15, 1925.

1,553,387

UNITED STATES PATENT OFFICE.

DAVID McDERMOTT, OF MILFORD, MASSACHUSETTS.

QUICK-ACTING GAUGE.

Application filed August 14, 1924. Serial No. 731,915.

*To all whom it may concern:*

Be it known that I, DAVID McDERMOTT, a citizen of the United States of America, and a resident of Milford, county of Worcester, and State of Massachusetts, have invented certain new and useful Improvements in Quick-Acting Gauges, of which the following is a specification.

This invention relates to gauges and has for its object the production of a quick acting gauge which may be manufactured at small cost and which is very effective in operation.

These objects are attained by the mechanism illustrated in the accompanying drawing.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings.

Similar characters indicate like parts throughout the several figures of the drawings.

Figure 1:
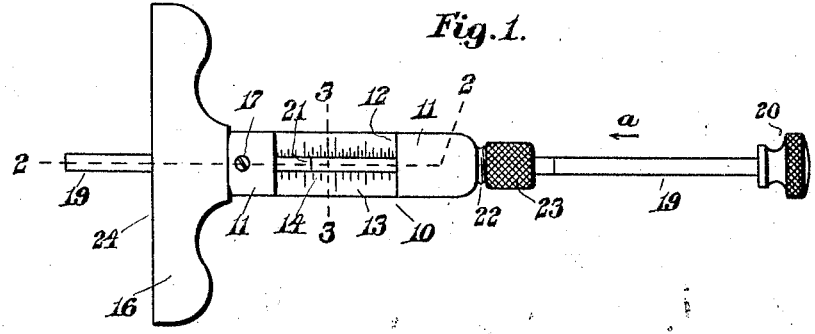
Figure 1 represents a plan of a gauge embodying the principles of the present invention.

In the drawings 10 is a head having two upwardly extending ears 11, 11 forming a recess 12 having a flat bottom face 13 on which is formed a graduated scale 14.

One end of the head 10 has a cylindrical socket therein to receive the projecting end of a bushing 15, the opposite end of which is driven into a straight edge 16.

Figure 2:
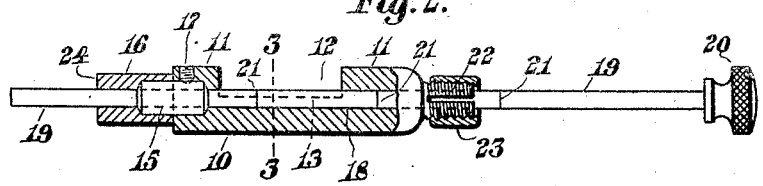
Figure 2 represents a vertical section of same on line 2, 2 on Fig. 1.
Figure 3:
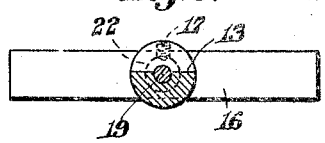
Figure 3 represents a transverse section of same on line 3, 3 on Figs. 1 and 2.
Figure 4:
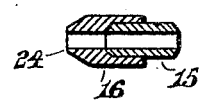
Figure 4 represents a section of the straight edge and its bushing.

This straight edge 16 may be of equal thickness throughout as indicated in Fig. 2 or it may be tapered as shown in Fig. 4.

The projecting end of the bushing 15 is retained in the socket in head 10 by means of the set screw 17.

The head 10 has a cylindrical hole 18 extending lengthwise thereof in which is slidably disposed a rod 19 having a knob 20 on one end thereof.

This rod 19 has spaced markings thereon such as the rings 21 which are preferably one inch apart and the scale 14 is preferably one inch long.

On the end of head 10 opposite to the straight edge 16 is a projecting hub 22 which is threaded, split and slightly tapering.

On this hub 22 is threaded a nut 23 which may be adjusted on said hub to cause the separated portions of said hub to impinge upon the rod 19 and clamp it in adjusted position.

The normal position of the rod is with one end flush with the face 24 of the straight edge 16 and its first ring 21 registering with the zero mark of said graduated scale 14.

If the rod 19 is moved endwise in direction of arrow *a* to project an end thereof beyond the face of straight edge 16 it is obvious that the ring 21 will register with the graduations of said scale and indicate the exact distance that the end of said rod is projected beyond the face 24 of the straight edge 16.

When the face 24 of the straight edge 16 is planed off the bushing 15 may be so adjusted in the socket of said straight edge 16 that the end of rod 19 will be flush with face 24 when the first ring 21 is at zero mark on the graduated scale 14.

The graduations of said scale 14 may be of such a character as to suit different conditions.

The gauge may be used for obtaining the depth of a socket or depression and for a variety of other purposes too numerous to mention.

As the gauge rod 19 is freely movable in the head 10 it is quick acting and the readings may be made instantly.

The graduated scale being formed in the bottom face 13 of the recess 12 it is protected from wear and therefore is always plainly visible.

The operation and many advantages of the invention will be apparent without further description.

Having thus descirbed my invention, I claim:

1. The combination of a head having a flat faced recess, the face of which is provided with a graduated scale; and a rod slidable in said head and having markings thereon adapted to register with said scale, said markings being spaced apart a distance equal to the length of said scale.

2. The combination of a head having a flat faced recess, the face of which is provided with a graduated scale extending from end to end of said recess; a rod slidable in said head and having markings thereon adapted to register with said scale, said markings being spaced apart a distance equal to the length of said recess; and a straight edge on one end of said head.

3. The combination of a head having a flat faced recess, the face of which is provided with a graduated scale between the shouldered ends of said recess; a rod slidable in said head and having peripheral rings thereon adapted to register with said scale, said rings being spaced apart a distance equal to the length of said scale; a split threaded projection at one end of and formed integral with said head; and clamping nut on said threaded projection.

4. The combination of a head having formed therein at a point removed from the ends thereof, a flat faced recess having thereon a graduated scale of predetermined length; a rod slidable freely in said head and having a plurality of markings thereon spaced apart a distance equal to the length of said scale; and means at one end of said head for clamping said rod in adjusted position.

5. The combination of a head having formed in its periphery a flat faced recess having thereon a graduated scale of predetermined length and provided at one end with a socket; a straight edge having a projection adapted to be disposed in said socket; means for securing said projection in said socket; a rod freely slidable in said head and straight edge and having a plurality of markings thereon spaced apart a distance equal to said length of said scale with which said markings are adapted to register; and means for locking said rod in adjusted position.

6. The combination of a head having formed in its periphery a flat faced recess having thereon a graduated scale of predetermined length and provided at one end with a socket; a straight edge having a projection adapted to be disposed in said socket and moved about the axis of said head; means for securing said projection in said socket; a rod freely slidable in said head and straight edge and having a plurality of markings thereon spaced apart a distance equal to said length of said scale with which said markings are adapted to register; and means for locking said rod in adjusted position.

Signed by me at Milford, Mass. this 12th day of July, 1924.

DAVID McDERMOTT.